June 28, 1932.  C. H. HAPGOOD  1,864,537
WEIGHING SCALE
Filed June 30, 1927
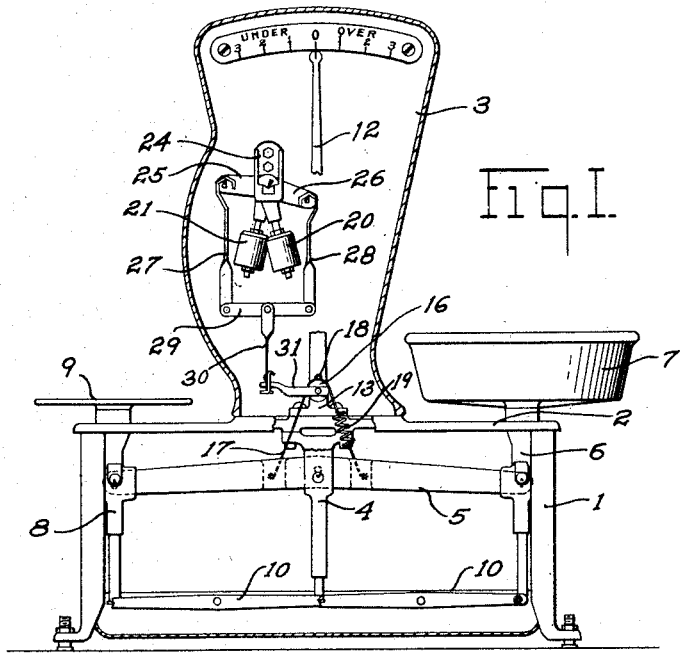
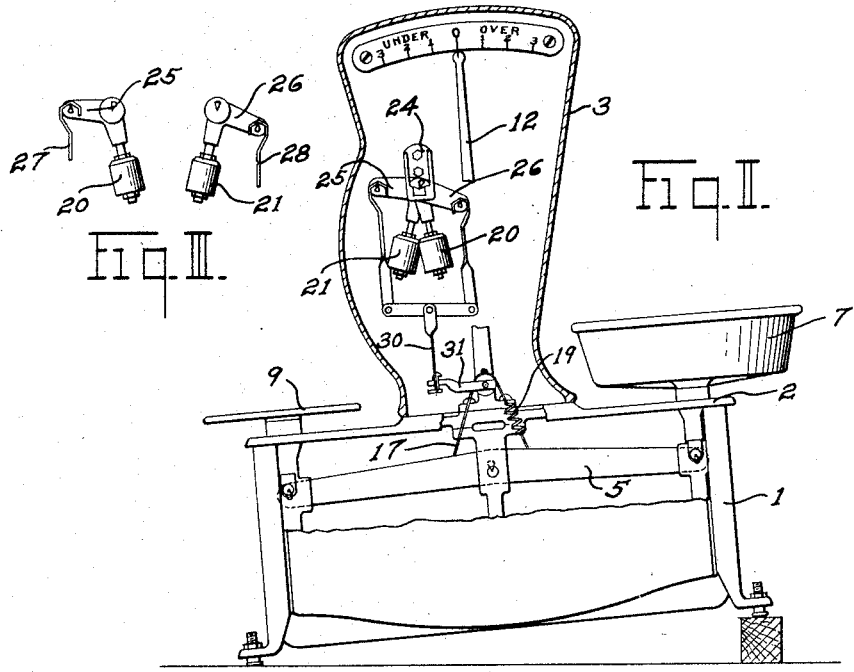
Inventor
Clarence H. Hapgood
By CO Marshall
Attorney Patented June 28, 1932

1,864,537

UNITED STATES PATENT OFFICE

CLARENCE H. HAPGOOD, OF TOLEDO, OHIO, ASSIGNOR TO TOLEDO SCALE MANUFACTURING COMPANY, OF TOLEDO, OHIO, A CORPORATION OF NEW JERSEY

WEIGHING SCALE

Application filed June 30, 1927. Serial No. 202,508.

This invention relates to weighing scales, and more particularly to scales of the so-called predetermined weight type, and one of the principal objects of the invention is the provision of simple means to cause the scale to weigh correctly when it is in an out-of-level position.

Another object of the invention is the provision of a pendulum mechanism which will automatically compensate for an out-of-level condition of the scale.

Another object is the provision of a scale of the predetermined weight type having an indicator, the movement of which is amplified many times that of the main lever.

And still another object is the provision of a predetermined weight scale which is sturdy in construction and is simple and comparatively inexpensive to manufacture.

Other objects and advantages will be apparent from the following description, in which reference is had to the accompanying drawing illustrating a preferred embodiment of my invention and wherein similar reference numerals designate similar parts throughout the several views.

In the drawing:—

Figure I is an elevational view of the scale of my invention, parts being broken away and parts shown in section;

Figure II is a view of the scale shown in Figure I in an out-of-level position;

Figure III is a fragmentary detail view of the pendulums employed in my invention, showing them in disassembled relation.

Referring to the drawing in detail, I have shown my invention as embodied in a weighing scale of the so-called double pan lighthouse type. However, it is to be understood that I contemplate its use in any machine in which it may be found applicable.

The scale consists of a box-like base housing 1 provided with a suitable cover 2, and erected centrally upon the cover 2 is an upright casing 3. Depending from the cover 2 is a bracket 4 upon which is fulcrumed an even arm lever 5, one end of the lever pivotally supporting a spider 6 surmounted by a commodity-receiver or pan 7, the other end of the lever pivotally supporting a spider 8 which carries a weight-receiving platter 9. The depending extremities of the spiders 6 and 8 and the bracket 4 are pivotally connected together by means of a plurality of links 10 engaging knife edge members secured to the spiders and bracket. It will be obvious that with this construction the load and weight-receiving pan and platter are prevented from tipping throughout the weighing movements of the scale.

The indicating hand 12 is supported at its lower end upon anti-friction bearings (not shown) carried in a bracket 13 secured to the cover 2. The indicating hand 13 is provided with a drum 16 whose axis is coincident with the axis of oscillation of the indicator and is connected by means of a flexible metallic ribbon 17 to the lever 5. The ribbon passes over the drum 16 and is secured thereto by means of a screw 18, the ends of the ribbon being secured to the lever at equal distances either side of its fulcrum.

In order to compensate for inaccuracies in manufacture or for variations in temperature, a small contractile coil 19 may be interposed between two sections of the ribbon 17.

It will be obvious that the indicator 12 will normally register with the zero or central graduation on the chart 14 when there is no load upon the scale pan or weight platter. Should the scale be tipped to an out-of-level position, however, the pendulum effect in the lever 5 and associated parts which necessarily must be present in order to have a mechanism which will operate successfully causes the weighing mechanism to move relative to the scale housing, thus causing the indicating hand to move out of registration with the zero graduation on the chart. It is not always convenient, and causes a great loss of time, to re-level the scale, especially when it is being shifted from place to place every few minutes. This is particularly true in the packing industries, where one scale may be used in a place for checking the weights of packages of one kind or size for a short time and then taken to another place and used for checking the weights of packages of another kind or size. Each time the scale is moved it would ordinarily have to be re-leveled. To obviate these difficulties I have equipped the scale with a pair of pendulums 20 and 21 provided with knife edge pivots which are pivotally supported upon bearings carried in a bracket 24 secured to the upright housing 3. The pendulums are so supported as to oscillate about the same pivotal axis and are formed with arms 25 and 26 having knife edge pivots which are connected by means of links 27 and 28 to the respective ends of a substantially horizontal equalizing bar 29. The bar 29 is pivoted at a point midway between the points of connection of the bar to the links 27 and 28 to a depending link 30, the lower end of the latter being connected to the extremity of an arm 31 secured in a suitable manner to the drum 16. It will be apparent that the angles made by the pendulums 20 and 21 with their respective arms 25 and 26 are not equal (see Figure III) and that assembled as in Figure I the pendulums assume positions an equal distance either side of an imaginary vertical line passing through the pivotal axes thereof. The arms 25 and 26 of the pendulums, therefore, project in opposite directions respectively above and below an imaginary horizontal line passing through the pivotal axes of the pendulums. Thus, when the scale is shifted, for example, to the position shown in Figure II, the pendulums will swing to a position which, with respect to the imaginary vertical line passing through their pivotal axes, is the same as that shown in Figure I, the bar 29 remaining in a horizontal position relative to the surface supporting the scale, and the indicator continues to register with the central graduation on the chart.

As shown in the drawing, the power arm 25 extends upwardly from the fulcrum pivot of its pendulum when the scale is not under load, while the power arm 26 extends substantially horizontally or downwardly. The object of this arrangement of the power arms is to cause the indicator hand to move through substantially the same distances for equal increments of load. When the power arm of the load-counterbalancing pendulum is so arranged that it extends upwardly when the scale is not under load, the distance moved by the pendulum for successive equal increments of load decreases as the power arm moves toward horizontal position. When the power arm of the pendulum is horizontal with the scale under no load, the angles through which the pendulum swings in moving to counterbalance equal increments of load increase as the power arm swings downwardly away from horizontal position. According to the applicant's invention, the power arms 25 and 26 are so arranged that the tendency of the angles of movement of the pendulum 20 to increase is substantially neutralized by the tendency of the angles of movement of the pendulum 21 to decrease as successive equal increments are added to the load upon the scale. The result is that the pendulums 20 and 21 and the indicator 12 swing through substantially equal arcs as equal increments of load are added to the commodity-receiver.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a frame, an even arm lever pivoted on said frame, a commodity-receiver supported upon one end of said even arm lever, a poised receiver supported upon the other end of said lever an indicator connected to said lever, a pair of oppositely swinging pendulums pivotally supported on coincident axes on said frame, and means connecting said pendulums and said lever whereby said pendulums are caused to normally hold said lever and said indicator in the same position relative to said frame.

2. In a device of the class described, in combination, a frame, a lever and an indicator pivoted thereon, a commodity-receiver supported by said lever, a pair of pendulums pivotally supported on coincident axes on said frame, an equalizer connected to said pendulums, and means connecting said equalizer to said lever whereby the position of said lever and indicator is substantially unaffected by swinging movement of said pendulums in the same direction and are swung by opposite swinging movement of said pendulums.

3. In a device of the class described, in combination, a frame, a lever fulcrumed on said frame, a commodity-receiver supported by said lever, a pair of pendulums pivotally supported on said frame, an equalizer bar, means connecting one end of said equalizer bar to each of said pendulums, a swinging arm, and motion multiplying means connecting said swinging arm to said lever, the arrangement being such that movement of said lever about its fulcrum in one direction is resisted by said pendulums and the position of said lever relative to said frame remains unchanged when said pendulums swing relatively thereto in the same direction.

4. In a device of the class described, in combination, a pair of pendulums supported on coincident axes, each of said pendulums having a power arm, the angle of one of said power arms with its pendulum stem being more obtuse than the angle of the other of said power arms with its pendulum stem lever mechanism, and means including an equalizer connecting said power arms with said lever mechanism.

5. In a device of the class described, in combination, a commodity-receiver, a pair of load-counterbalancing pendulums supported on coincident axes, said load-counterbalancing pendulums having oppositely extending power arms, the power arm of one of said pendulums extending upwardly from the fulcrum pivot of the pendulum when the commodity-receiver is not under load, the arm of the other of said pendulums extending substantially horizontally when the commodity-receiver is not under load and means including an equalizer for connecting said commodity-receiver with said pendulums.

6. In a device of the class described, in combination, a frame, an upright housing mounted above said frame, indicating means in said housing, an even arm lever pivoted on said frame, a commodity-receiver supported upon one end of said even arm lever, a poise-receiver supported upon the other end of said lever, means connecting said lever and said indicating mechanism, and a pendulous mass connected to said lever independently of said indicator and a second pendulous mass connected to said lever to prevent movement of said indicating mechanism when the condition of level of said frame and housing is changed.

CLARENCE H. HAPGOOD.